United States Patent [19]

Kusunoki et al.

[11] Patent Number: 5,038,230
[45] Date of Patent: Aug. 6, 1991

[54] METHOD OF ACCURATELY EXECUTING READ ACCESS AND MAGNETIC RECORDING/REPRODUCING APPARATUS THEREFOR

[75] Inventors: Masahiro Kusunoki, Tachikawa; Koji Osafune; Hiroshi Okamura, both of Hamura; Yoshihisa Nakamori, Oome, all of Japan

[73] Assignee: Kabushiki Kaisha Toshiba, Kawasaki, Japan

[21] Appl. No.: 389,883

[22] Filed: Aug. 4, 1989

[30] Foreign Application Priority Data

Aug. 30, 1988 [JP] Japan ............................. 63-215619

[51] Int. Cl.⁵ .............................................. G11B 5/02
[52] U.S. Cl. ...................................................... 360/46
[58] Field of Search ..................................... 360/46, 60

[56] References Cited

U.S. PATENT DOCUMENTS 4,750,061  6/1988  Kawasaki .............................. 360/60
4,912,574  3/1990  Kobayashi et al. ................... 360/60

FOREIGN PATENT DOCUMENTS 59-213016  12/1984  Japan .

OTHER PUBLICATIONS

Toshiba Review No. 154 Winter 1985, PP18-22 "Barium Ferrite Perpendicular Recording Floppy Disk".
Toshiba Review No. 43, vol. 5 (1988), pp. 425-528, "3.5-Inch 4Mbyte Ba-Ferrite Floppy Disk and Drive Equipment".

Primary Examiner—David J. Severin
Attorney, Agent, or Firm—Oblon, Spivak, McClelland, Maier & Neustadt

[57] ABSTRACT

A magnetic recording/reproducing apparatus includes a control section, a recording section and a medium access section having a head. The control section sets a write mode in response to an input write access command, and outputs write data and density indication data to the recording section. In the write mode, the recording section generates dummy data in accordance with the density indication data and modulates a write current in accordance with the write data and the dummy data subsequent to the write data. The modulated write current is supplied to the medium access section. A value of the write current is determined in accordance with the density indication data, and the write current decays with a time constant while the write current is modulated in accordance with the dummy data. The medium access section write-accesses a medium in accordance with the modulated write current in the write mode.

19 Claims, 6 Drawing Sheets

METHOD OF ACCURATELY EXECUTING READ ACCESS AND MAGNETIC RECORDING/REPRODUCING APPARATUS THEREFOR

BACKGROUND OF THE INVENTION

1. Field of the Invention

The present invention relates to a method of accurately executing read access of a recording medium having a high recording density while keeping compatibility with a recording medium having a low recording density and a magnetic recording/reproducing apparatus therefor.

2. Related Art of the Invention

Figure 1A:
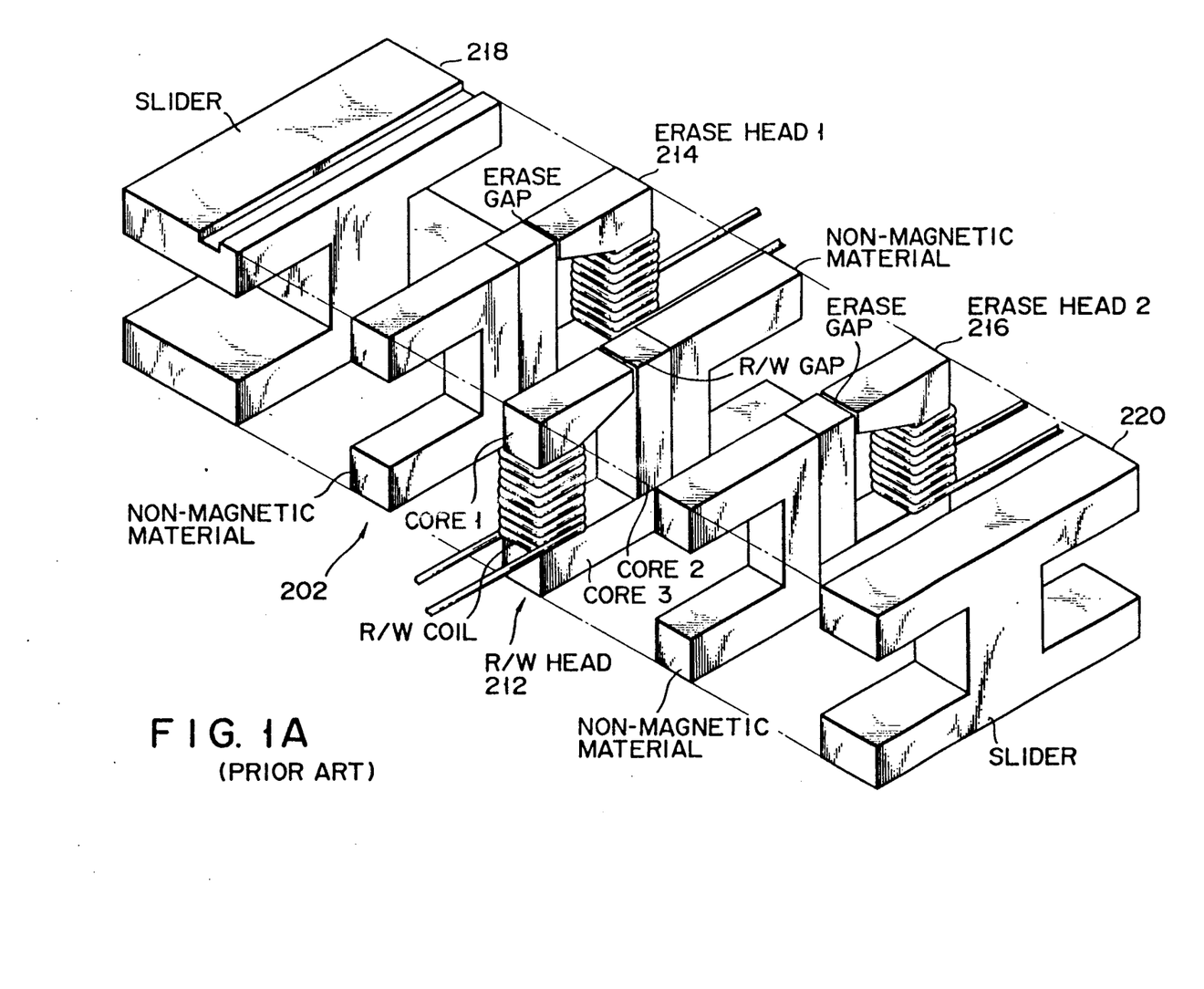
FIG. 1A is a perspective view showing a structure of a conventional magnetic head.
Figure 1B:
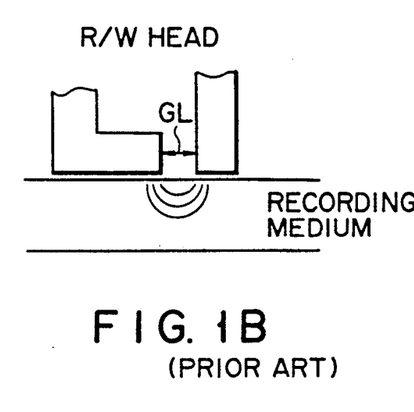
FIGS. 1B and 1C are sectional views for explaining a difference in depths of magnetization in recording media caused by a difference in length of an R/W gap of an R/W head.

In a conventional magnetic recording/reproducing apparatus, e.g., a floppy disk apparatus, a magnetic head 202 shown in, e.g., FIG. 1A is used. The magnetic head 202 is of a laminate tunnel erase type. Erase head structures 214 and 216 are fixed to two sides of a read/write (R/W) head structure 212, and sliders 218 and 220 are fixed to two sides of the resultant assembly. The R/W head is formed by cores 1, 2, and 3 each of which is made of a magnetic material having a relatively large coercive force, and an R/W coil wound around a bobbin. The length of an R/W gap GL is relatively large, and, hence, a floppy disk as a recording medium is magnetized up to a deep portion thereof, as shown in FIG. 1B. The erase head structure is the same as the R/W head structure.

Since the magnetic material having a large coercive force is used as a conventional head material, large residual magnetization is present in the R/W head after write access is executed. For this reason, if a seek operation is performed after the write access, data already recorded on another track is erased or rewritten by the residual magnetization. In the conventional recording/reproducing apparatus, in order to erase the residual magnetization of the head after execution of the write access, a degaussing circuit is normally used.

Along with advances in technologies, a new magnetic material for a head has been developed. The new magnetic material has good high-frequency permeability characteristics and large saturated magnetization but has a small coercive force. As a result, residual magnetization in the head is small even after write access is executed. Thus, the above problem can be eliminated, and the degaussing circuit can be omitted.

With the development of the new magnetic material, the recording density of a recording material, e.g., floppy disk is increased. Various methods for increasing a recording density are known. Of these methods, a method of increasing a line recording density is known. For this purpose, the length of a read/write (R/W) gap must be decreased and a recording frequency must be increased. In recent years, the length of the R/W gap tends to decrease, and disks having a higher recording density gain their popularity on the market.

Figure 2:
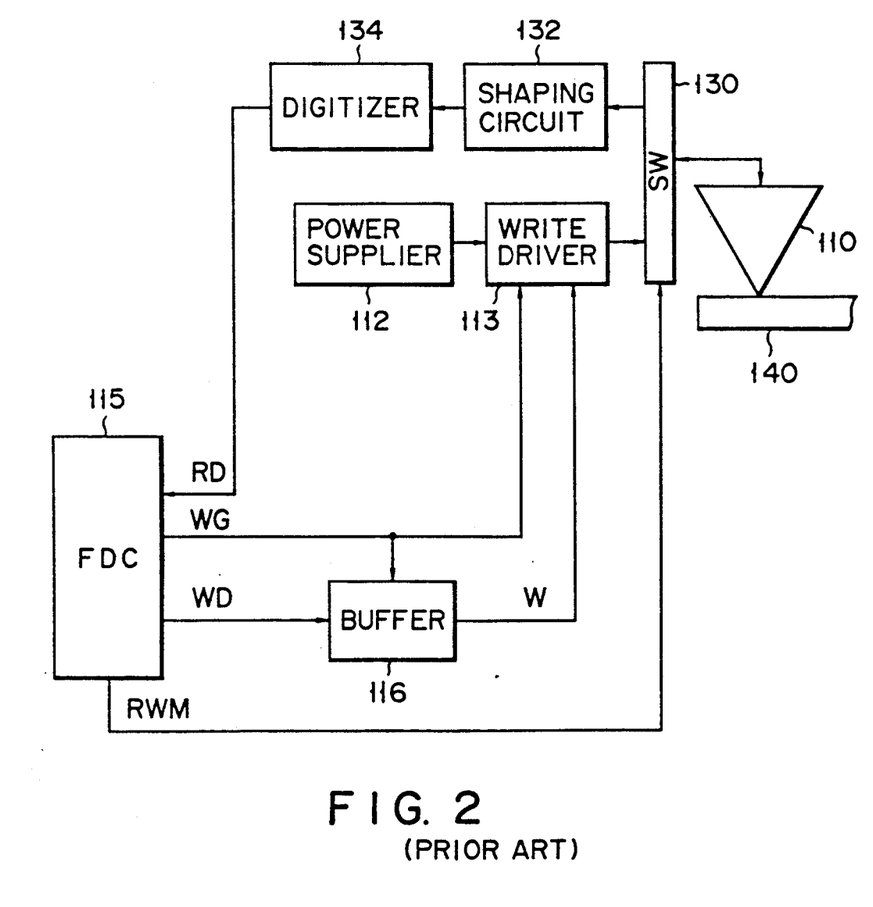
FIG. 2 is a block diagram for explaining an arrangement of a conventional recording/reproducing apparatus.

A conventional recording/reproducing apparatus for a recording medium having a high recording density is arranged as shown in FIG. 2. In order to write data on a recording medium, e.g., a floppy disk, a floppy disk controller (FDC) 115 generates a write gate signal WG and a write data signal WD. The FDC 115 supplies the signal WG to a buffer 116 and a write driver 113, and supplies the signal WD to the buffer 116. The buffer 116 gates the signal WD with the signal WG to generate a signal W, and outputs the signal W to the driver 113.

The write driver 113 outputs a current from a power supplier 112 to a switch circuit 130 in accordance with the signals WG and W. The switch circuit 130 supplies a write current from the write driver 113 to a magnetic (R/W) head 110 in accordance with a read/write mode control signal RWM from the FDC 115. Thus, the data can be written on a floppy disk 140.

When data is read out from the floppy disk 140, a signal read out from the disk 140 by the R/W head 110 is wave-shaped by a shaping circuit 132, and the shaped signal is supplied to a digitizer 134. The digitizer 134 converts the signal from the circuit 132 into a digital signal, and outputs the digital signal to the FDC 115 as a signal RD. Thus, data recorded on the floppy disk 140 can be read out.

Figure 1C:
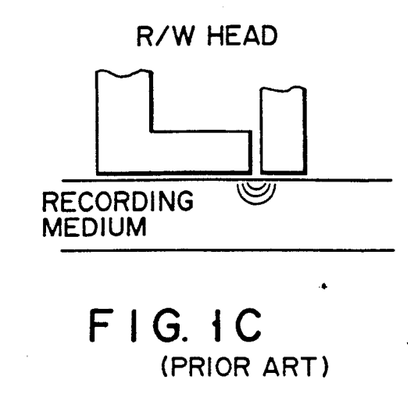

The recording medium is accessed as described above. When the length of the R/W gap is decreased, the depth of magnetization in the recording medium is decreased as compared to that obtained when the conventional R/W head is used, as shown in FIG. 1C. Since a recording frequency is often different, it is difficult to provide compatibility, and a problem in terms of cost is also posed. A strong demand has arisen for a magnetic recording/reproducing apparatus having compatibility with recording media having different recording densities.

As described above, as a recording density is increased, the depth of magnetization in the recording medium is decreased as compared to that obtained when the conventional R/W head is used. In addition, an output voltage appearing across the R/W coil of the R/W head tends to decrease. For this reason, the influence of noise is not negligible, and a phenomenon that is not known in a conventional apparatus tends to occur. For example, a read error sometimes occurs.

SUMMARY OF THE INVENTION

The present invention has been made in consideration of the above situation, and has as its object to provide a method of accurately executing read access with respect to a recording medium having a high recording density while keeping compatibility with a recording medium having a low recording density and a magnetic recording/reproducing apparatus therefor.

In order to achieve the object, the magnetic recording/reproducing apparatus according to the present invention, comprises a control section, a recording section and a medium access section having a head. The control section sets a write mode in response to an input write access command, and outputs write data and density indication data to the recording section. In the write mode, the recording section generates dummy data in accordance with the density indication data and modulates a write current in accordance with the write data and the dummy data subsequent to the write data. The modulated write current is supplied to the medium access section. A value of the write current is determined in accordance with the density indication data, and the write current decays with a time constant while the write current is modulated in accordance with the dummy data. The medium access section write-accesses a medium in accordance with the modulated write current in the write mode.

In order to achieve another object the method comprises:
generating a write current in response to a write gate signal in a write mode, a level of the write current being determined in accordance with a density of a set medium and being at a constant level during a first time period and decaying with a time constant during a second time period;

modulating the write current with write data during the first time period;

generating dummy data to modulate the write current with the dummy data during the second time period; and write-accessing the set medium by means of a head in accordance with the write current.

As described above according to the present invention, dummy data is additionally written after data write access on a magnetic recording medium, so that an error in a read mode can be eliminated. Therefore, accurate read/write access can always be realized even after write access. When a recording medium having a low recording density is accessed, even if a voltage across an R/W coil is further decreased, read access can be reliably executed without causing an error.

DETAILED DESCRIPTION OF THE PREFERRED EMBODIMENTS

A magnetic recording/reproducing apparatus according to the present invention will now be described with reference to the accompanying drawings.

Figure 3:
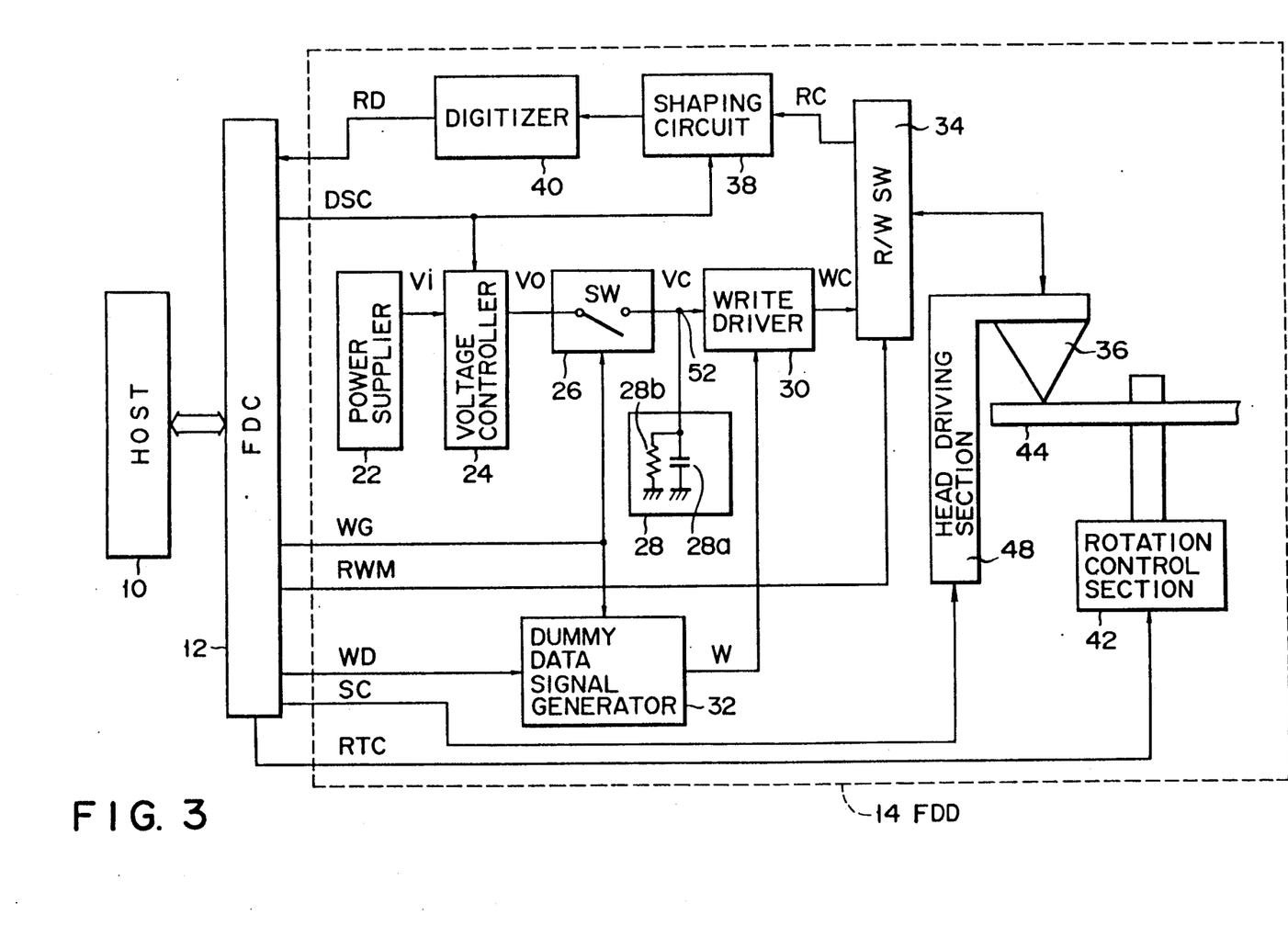
FIG. 3 is a block diagram showing an arrangement of a recording/reproducing apparatus according to a first embodiment of the present invention.

FIG. 3 is a block diagram showing an arrangement of a first embodiment in which the magnetic recording/reproducing apparatus of the present invention is applied to a floppy disk apparatus. In this embodiment, as a recording medium (floppy disk) 44, a 4-Mbyte 2ED disk and a 1-Mbyte 2DD disk can be commonly used.

In FIG. 3, a host 10 sends various commands and write data to a floppy disk controller (FDC) 12, and receives read data from the FDC 12. When the host determines based on the read data that the recording density of a recording medium is different from a current setting value, it outputs a recording-density change command to the FDC 12. The FDC 12 generates a write data signal WD based on the write data from the host 10, and outputs it to an FDD (floppy disk drive) 14. The FDC 12 receives a read data signal RD from the FDD 14, and outputs it to the host 10 as read data. The FDC 12 generates various interface signals necessary for read/write access to the FDD in accordance with the various commands from the host 10, and outputs these signals to the FDD 14. More specifically, the FDC 12 generates a rotation control signal RTC for controlling a rotational speed of the floppy disk 44 as the recording medium in response to a rotation control command from the host 10, a write gate signal WG for controlling a write timing in response to a write command, a mode control signal RWM for controlling a read/write mode, a density control signal DSC for controlling an operation of the FDD 14 in response to the recording density change command, and a seek control signal SC in response to the read or write command. The FDC 12 supplies these signals to the FDD 14.

The arrangement of the FDD 14 will be described below. A voltage Vi from a power supplier 22 is supplied to a voltage controller 24. The voltage controller 24 is set in a 4- or 1-Mbyte mode in response to the signal DSC from the FDC 12. The controller 24 converts the voltage Vi from the power supplier 22 into a voltage Vo, and outputs it to a switch SW 26. The voltage Vo in the 4-Mbyte mode is lower than that in the 1-Mbyte mode. The switch SW 26 is closed in response to the signal WG of logic "0", and outputs the voltage Vo from the voltage controller 24 as a voltage Vc to a node 52. The node 52 is connected to a charger/discharger 28 and a write driver 30.

A dummy data signal generator 32 receives the signals WD and WG from the FDC 12. When the signal WG is at logic "0", the generator 32 outputs the signal WD as a signal W to the write driver 30. In response to transition of the signal WG from logic "0" to logic "1", the generator 32 generates a dummy data signal, and outputs it as a signal W to the write driver 30.

The write driver 30 modulates a current having a current value determined by the voltage Vc appearing at the node 52 with the signal W, and outputs the modulated current as a write current WC to a read/write switch (R/W SW) 34. This modulation is performed since an optimal write current value for the floppy disk 44 differs depending on a gap length. The charger/discharger 28 comprises a capacitor 28a and a resistor 28b. The capacitor 28a is charged by the voltage Vo from the voltage controller 24 while the signal WG is at logic "0". When the signal WG goes to logic "1", since the switch 26 is opened, the charger/discharger 28 is discharged with a time constant almost determined by the capacitor 28a and the resistor 28b. Therefore, even after the signal WG goes to logic "1", the attenuating voltage Vc appears at the node 52 for a predetermined period of time. During this interval, a portion of the signal W corresponding to the dummy data signal is supplied from the generator 32.

A rotation control section 42 drives the floppy disk in accordance with the signal RTC from the FDC 12. A head driving section 48 causes a magnetic head 36 to seek a destination track in response to the signal SC from the FDC 12. In a write mode, the switch 34 selects the write current WC from the write driver 30 in accordance with the signal RWM from the FDC 12, and supplies it to the magnetic head 36. The magnetic head 36 write-accesses the floppy disk 44 in accordance with the write current WC. Thus, write data from the host 10 is written on the disk 44.

In a read mode, the magnetic head 36 reads out data from a destination track of the floppy disk 44, and supplies a read current RC corresponding to the read-out data to the switch 34. The switch 34 outputs the read current RC to a shaping circuit 38 in accordance with the signal RWM from the FDC 12. The shaping circuit 38 includes an amplifier, a filter, a differentiator, and the like. The constant of the filter is determined in accordance with the signal DSC from the FDC 12, and takes different values in the 4-Mbyte mode and the 1-Mbyte mode. The state of the signal DSC is designated by the host 10 on the basis of the recording density of the floppy disk 44. The shaping circuit 38 waveshapes the signal represented by the read current, and outputs the shaped signal to a digitizer 40. The digitizer 40 converts the input signal into a digital signal, and output the digital signal to the FDC 12 as a read data signal RD. The FDC 12 generates read data based on the signal RD, and sends it to the host 10.

Figure 4:
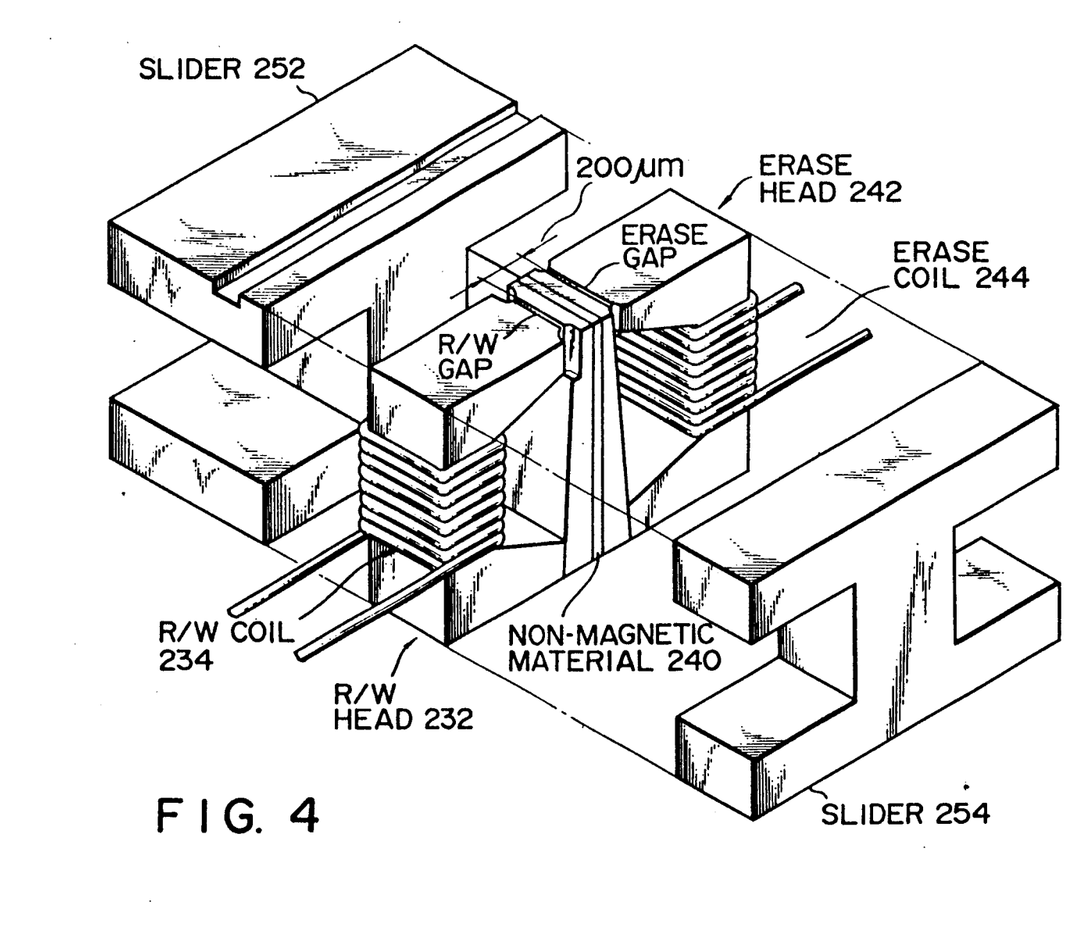
FIG. 4 is a perspective view for explaining a structure of a magnetic head used in the present invention.

In this embodiment, the magnetic head 36 is of a wide pre-erase type, and has a structure, as shown in FIG. 4. A read/write (R/W) head 232 and an erase head 242 are coupled to sandwich a non-magnetic material spacer 240 therebetween, i.e., to be separated at a distance of, e.g., 200 μm, so that an R/W gap and an erase gap are as close as possible. The assembly of the R/W head 232 and the erase head 242 are sandwiched by sliders 252 and 254 from two sides. Table 1 below shows comparison results between a conventional laminate type head and a bulk type head of this embodiment.

TABLE 1

| Type | Conventional Head Laminate Tunnel Erase Type | Head of the Present Invention Bulk Pre-erase or Tunnel Erase Type |
|---|---|---|
| Magnetic Path Length | Long | Short |
| Residual Magnetic Flux Density | High | Low |
| Gap Length | Relatively long | Relatively short |
| Interval between R/W Head and Erase Head | Relatively wide | Relatively narrow |

As can be apparent from Table 1, along with advances in magnetic head manufacturing techniques, a recording density is increased, and a track width and a gap length are decreased. In this embodiment, the gap length of the R/W gap is 0.2 to 1.0 μm. Since the number of turns of an R/W coil 234 also tends to decrease, a voltage appearing across the coil 234 is considerably decreased as compared to a conventional head. For this reason, the head of the present invention has a lower noise resistance than that of the conventional head, and small noise components may pose a problem. When data is read out from the 2ED type floppy disk having a record capacity of 4 Mbytes, a voltage appearing across the R/W coil is about several hundreds of mVpp in general, i.e., has a very low voltage level as compared to the conventional laminate type head whose output voltage is several thousands of mVpp in general. When a 2DD type floppy disk having a recording capacity of 1 Mbyte is accessed using an R/W head for the 2ED type disk, the output voltage is further lowered, and the noise resistance is further lowered.

The operation of the first embodiment will be described below with reference to FIGS. 5A to 5D. In this embodiment, a 4-Mbyte 2ED type disk and a 1-Mbyte 2DD type disk can be commonly used as the floppy disk 44. Assume that the 4-Mbyte mode is set in the present state.

The host 10 outputs a write command to the FDC 12, and the write mode is set. In the write mode, the FDC 12 outputs the signal RWM to the switch 34. Thus, the switch 34 is controlled to supply the write current WC from the write driver 30 to the magnetic head 36. The FDC 12 outputs the rotation control signal RTC to the rotation control section 42. In response to the signal RTC, the disk 44 is rotated.

Figure 5:
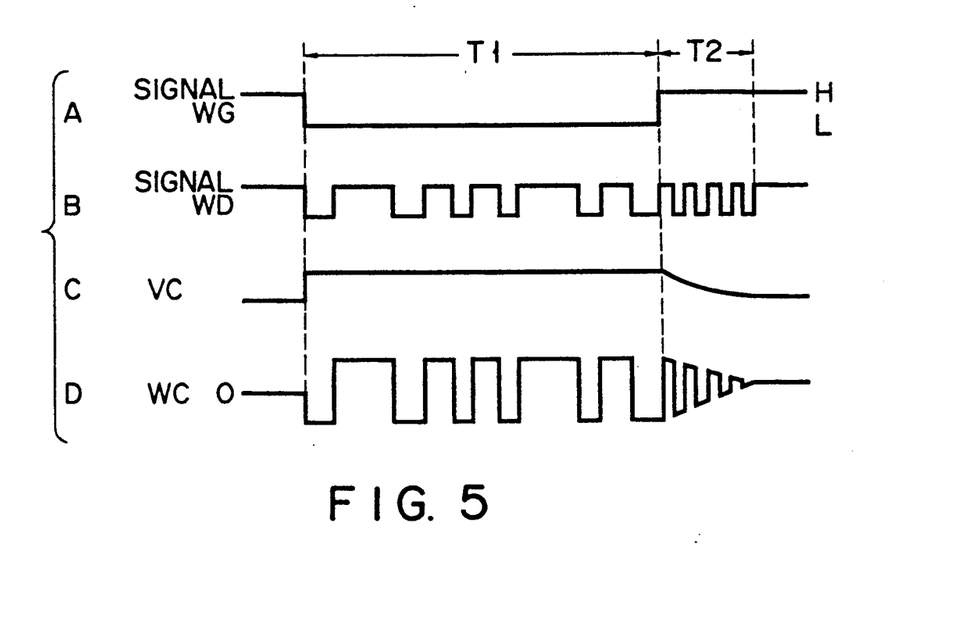
FIGS. 5A to 5D are timing charts for explaining the operation of the first embodiment.

The FDC 12 detects on the basis of an elapsed time after the signal RTC is output that the rotational speed of the disk 44 which began to rotate in response to the signal RTC reaches a predetermined value. In this case, the FDC 12 generates the signal SC and output it to the head driving section 48. The section 48 causes the head 36 to seek the destination track in response to the signal SC generated by the FDC 12. The FDC 12 outputs the write gate signal WG and the write data WD to the FDD 14 at a timing corresponding to the beginning of a period T1. Since the switch 26 is closed in response to the signal WG, the output voltage Vo of the voltage controller 24 appears at the node 52, as shown in FIG. 5C. The dummy data signal generator 32 allows the signal WD from the FDC 12 to pass therethrough as the signal W, and supplies it to the write driver 30. The write driver 30 modulates a current in accordance with the signal W, as shown in FIG. 5D, and outputs the modulated current to the switch 34 as the write current WC. A peak value of the current is determined in accordance with the voltage appearing at the node 52. The R/W head 36 accesses the disk 44 in accordance with the write current, and writes write data on the disk 44. This operation continues for the period T1. The period T1 corresponds to a data area of a track where the head 36 is presently located. In this manner, the normal write access is completed. In this case, residual magnetization remains in the magnetic head 36.

Upon completion of write access of the write data, the signal WG goes to logic "1". Thus, the switch 26 is opened, and the output voltage Vo from the voltage controller 24 is no longer applied to the node 52. The capacitor 28a of the charger/discharger 29 has been charged to the voltage Vo while the signal WD is written on the disk 44. When the signal WG goes to logic "1", the capacitor 28a begins to discharge through the resistor 28b. During a period T2 in which the capacitor 28a is discharged, a voltage shown in FIG. 5C appears at the node 52. The generator 32 generates the dummy data signal whose logic level is alternately changed between "0" and "1", as shown in FIG. 5B, in response to transition of the signal WG from logic "0" to logic "1", and outputs it to the write driver 30 as the signal W. Thus, the dummy data is written in a gap area following the data area of the disk 44 in the same manner as in the write data.

Read access will be described below. Assume that a 1-Mbyte 2DD type disk 44 is set in the FDD 14 in the 4-Mbyte mode.

When the host 10 outputs a read command to the FDC 12, the FDC 12 generates the signal RWM, and outputs it to the switch 34. The switch 34 is switched to output the read current from the R/W head 36 to the shaping circuit 38 in response to the signal RWM. After the magnetic head 36 seeks a destination track by the head driving section 48 in response to the signal SC, data is read out from the disk 44, and the read current RC corresponding to the readout data is output to the shaping circuit 38 through the switch 34.

In the shaping circuit 38, the signal corresponding to the read current is shaped, i.e., amplified, and is filtered through the filter, thus obtaining a read data signal. The frequency range of the filter falls outside a preferable range since the 4-Mbyte mode is selected. The shaped signal is converted to a digital signal by the digitizer 40, and is output to the FDC 12 as the read data signal RD. The FDC 12 obtains the read data from the read data signal RD, and outputs the data to the host 10. The host 10 checks if the read data is correct. If the read data is wrong, the host 10 determines that a wrong byte mode is presently selected, and outputs the recording density change command to the FDC 12. In response to the change command, the signal DSC is output to the shaping circuit 38. Thereafter, the host 10 issues the read command to the FDC 12 again.

In the above-mentioned read access, a voltage appearing across the R/W coil of the magnetic head 36 is as shown in Table 2 below according to experiments of the present inventors.

TABLE 2

| Type | Head Output Voltage (mVpp) | No Dummy Data | Using Dummy Data | |
|---|---|---|---|---|
| 8" 2D | 2,000 | no error | — | Laminate Type |
| 5.25" 2DD | 2,000 | no error | — | |
| 2HD | 1,500 | no error | — | |
| 3.5" 2DD | 1,200 | no error | no error | Bulk Type |
| 2HD | 700 | no error | no error | |
| 2ED | 350 | error sometime occurs | no error | |
| 2DD | 250 | error sometime occurs | no error | write and read 2DD with 2ED drive |

As can be seen from Table 2, when a 2HD type disk having a recording capacity of 2 Mbytes was accessed by an R/W head therefor, a head output voltage was 700 mVpp, and no error occurred in read access even if no dummy data was written. However, when a 2ED type disk having a recording capacity of 4 Mbytes was accessed by an R/W head therefor, a head output voltage was 350 mVpp, and an error sometime occurred when no dummy data was written. The noise resistance is decreased due to a decrease in head output voltage. However, when dummy data was written, no read error occurred. It can be considered that noise caused by the head 36 is reduced. When a 2ED type head was used for a 2DD disk, a head output voltage was further decreased to 250 mVpp. When dummy data was written, no read error occurred even at this output voltage level. Thus, the method of the present invention is effective for an R/W head having a low head output voltage.

In the first embodiment, the pre-erase type head has been described. However, the present invention can also be applied to a tunnel erase head. The present invention is not limited to the dummy data pattern shown in FIG. 5B. The dummy data is written in the gap area but may be written in a data area.

In the first embodiment, the dummy data is always written. However, the signal DSC can be supplied to the dummy data signal generator 32, so that dummy data is selectively written in accordance with a recording capacity of a recording medium.

Figure 6:
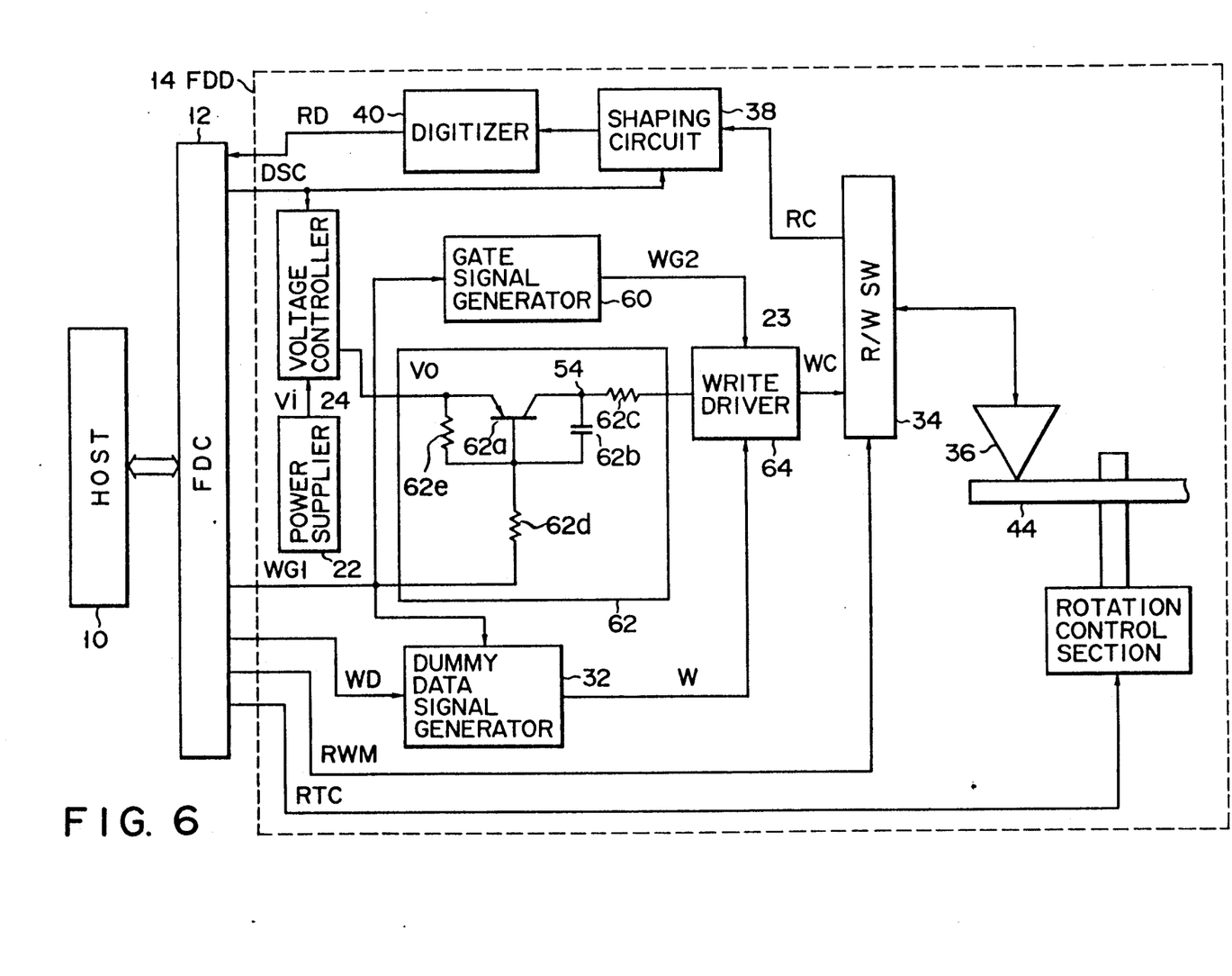
FIG. 6 is a block diagram showing an arrangement of a recording/reproducing apparatus according to a second embodiment of the present invention.

A magnetic recording/reproducing apparatus according to a second embodiment of the present invention will be described below with reference to FIG. 6. The same reference numerals in FIG. 6 denote the same parts as in the first embodiment shown in FIG. 3, and a detailed description thereof will be omitted. In addition, the head driving section is omitted in the figure.

A gate signal generator 60 generates a signal WG2 in response to a signal WG1 from an FDC 12, and outputs it to a write driver 64. The signal WG1 corresponds to the signal WG in the first embodiment, and is set at logic "0" during a period T1. The signal WG2 is set at logic "0" during a period (T1+T2). A voltage transmission circuit 62 has a combination of functions of the switch circuit 26 and the charger/discharger 28 in the first embodiment. The circuit 62 comprises an pnp transistor 62a, a resistor 62c connected between the collector of the transistor 62a and the write driver 64, a capacitor 62b connected between the collector and base of the transistor 62a, a resistor 62e connected between the emitter and base of the transistor 62a, and a resistor 62d for supplying the signal WG1 to the base of the transistor 62a.

Figure 7:
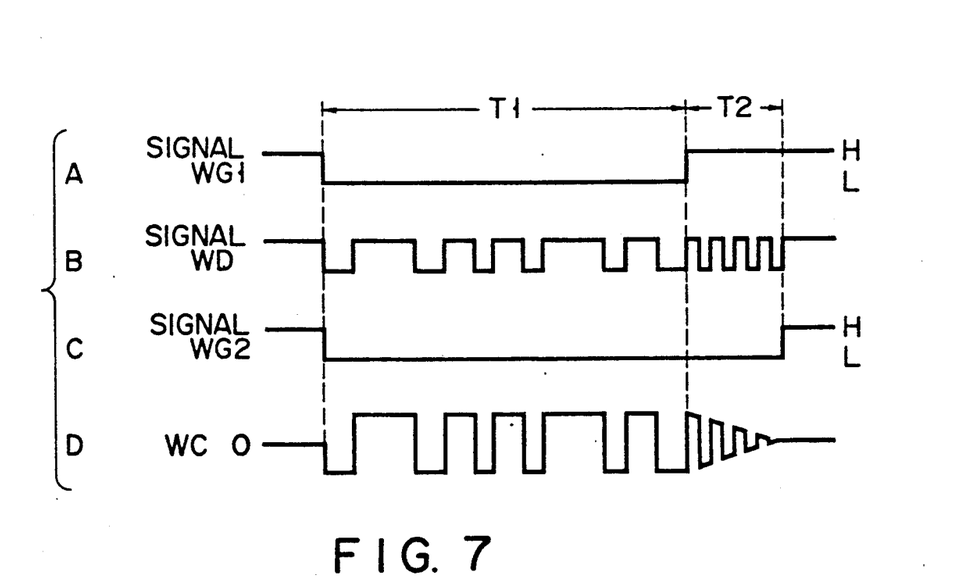
FIGS. 7A to 7D are timing charts for explaining the operation of the second embodiment.

As shown in FIG. 7A, when the signal WG1 of logic "0" is supplied from the FDC 12 to the base of the transistor 62a through the resistor 62d, the transistor 62a is turned on, and an output voltage Vo from the voltage controller 24 appears at the collector (node 54) of the transistor 62a as a voltage Vc. The capacitor 62b is charged while the signal WG1 is at logic "0". A dummy data signal generator 32 supplies the write data signal WD (FIG. 7B) supplied from the FDC 12 to the write driver as a write data signal W. The gate signal generator 60 generates the signal WG2, as shown in FIG. 7C, in response to the signal WG1 from the FDC 12, and outputs it to the write driver 64. The write driver 64 outputs a write current WC to a switch 34, as shown in FIG. 7D. The current WC has a current value determined by the voltage Vc appearing at the node 54 while the signal WG2 is being supplied, and the current WC is modulated with the signal W. Thus, write data is written on a destination trads of a floppy disk 44 as in the first embodiment.

Thereafter, when the signal WG1 goes to logic "1", the transistor 62a is turned off. As a result the capacitor 62b is discharged through the resistors 62c and 62d. The dummy data signal generator 32 generates dummy data whose logic level alternately changes between "0" and "1" in response to a change in signal WG from logic "0" to logic "1", and outputs it as the signal W to the write driver 64. Since the signal WG2 is kept supplied from the generator 60, the driver 64 outputs the write current WC to the switch 34, as shown in FIG. 7D. The current WC has a current value determined by the discharging voltage of the capacitor 62b, i.e., a voltage appearing at the node 54, and the current WC is modulated with the signal W. Thus, write data is written on the floppy disk 44 as in the first embodiment.

What is claimed is:

1. A magnetic recording/reproducing apparatus for recording write data on/reproducing the data from a medium with a head comprising:
control means for setting a write mode, and for generating the write data and density indication data;
recording means for, in the write mode, generating dummy data in accordance with the density indication data from said control means and for modulating a write current in accordance with the write data from said control means and the dummy data subsequent to the write data to produce the modulated write current, a value of the write current being determined in accordance with the density indication data, and the write current decaying with a time constant while the write current is modulated in accordance with the dummy data; and medium access means having said head, for write-accessing the medium by said head in accordance with the modulated write current from said recording means in the write mode.

2. An apparatus according to claim 1, wherein said medium access means further comprises means for read-accessing the magnetic medium to obtain a read current corresponding to data recorded on said medium in a read mode, said apparatus further comprises reproducing means for, in the read mode, reproducing read data from the read current generated by said read/write head in accordance with input density indication data which represents a density of said medium;

said control means further comprises means for setting the read mode to obtain the data from said reproducing means in response to an input read access command, for determining from the data whether the density indication data is adequate and for generating and outputting the density indication data to said reproducing means in accordance with a result determined.

3. An apparatus according to claim 1, further comprising medium drive means for rotating the medium with a rotation speed in accordance with the input density indication data from said control means.

4. An apparatus according to claim 1, wherein said control means includes means for generating a write gate signal in response to the write access command, and said recording means comprises:

write drive means for generating the write current proportional to a level of input current value control signal, and for modulating the write current in accordance with the write data and the dummy data input thereto to supply the modulated write current to said medium access means;

means for passing the write data from said control means to said write drive means in response to the write gate signal input thereto and for generating the dummy data in response to disappearance of the write gate signal to output the dummy data to said write drive means; and control signal generating means for generating the current value control signal in accordance with the density indication data from said control means; and control signal supply means responsive to the write gate signal, for supplying to said write drive means the current value control signal and the current value control signal whose level decays with the time constant in response to the disappearance of the write gate signal.

5. An apparatus according to claim 4, wherein said control signal supply means comprises:

switching means for supplying the current value control signal from control signal generating means to said write drive means in response to the write gate signal from said control means; and means for holding the current value control signal level in response to the supply of the current value control signal from said switching means to said write drive means and supplying the current value control signal level decaying with the time constant to said write drive means in response to stopping of the supply of the current value control signal from said switching means.

6. An apparatus according to claim 4, wherein said control signal supply means comprises:

switching means having a transistor for supplying the current value control signal from control signal generating means to said write drive means in response to the write gate signal from said control means; and means between a collector and a base of said transistor, for holding the current value control signal level in response to the supply of the current value control signal from said switching means to said write drive means and supplying the current value control signal level decaying with the time constant to said write drive means in response to stopping of the supply of the current value control signal from said switching means.

7. A method of accessing a magnetic disk with compatibility, comprising:

generating a write current in response to a write gate signal in a write mode, a level of the write current being determined in accordance with a density of a set medium and being at a constant level during a first time period and decaying with a time constant during a second time period;

modulating the write current with write data during the first time period;

generating dummy data to modulate the write current with the dummy data during the second time period; and write-accessing the set medium by means of a head in accordance with the write current.

8. An apparatus according to claim 7, wherein the first time period corresponds to a time period when the write gate signal is active.

9. An apparatus according to claim 7, wherein the dummy data is alternate data between logic 0 and logic 1.

10. An apparatus according to claim 7, wherein the head has an open output voltage lower than 700 mVpp when the head read-accesses the set disk.

11. An apparatus according to claim 10, wherein the head is of tunnel erase type.

12. An apparatus according to claim 10, wherein the head is of pre-erase type.

13. A recording/reproducing apparatus comprising:

access means having a head, for accessing a magnetic medium, said head having an open output voltage lower than 700 mVpp upon read-accessing said medium;

first writing means for causing said access means to write-access said medium in accordance with write data; and second writing means for generating dummy data after the write data is written on said medium by said first writing means and for causing said access means to write-access said medium in accordance with the dummy data, magnitude of magnetization of said head decaying with a time when the dummy data is written on said medium.

14. An apparatus according to claim 13, wherein said access means further comprises means for read-accessing said magnetic medium by means of said head to obtain a read current corresponding to data recorded on said medium in a read mode, said apparatus further comprises reproducing means for, in the read mode, reproducing read data from the read current in accordance with the density of said medium, and reproducing means in accordance with a result determined.

15. An apparatus according to claim 13, further comprising medium drive means for rotating said medium with a rotation speed in accordance with the density of said medium.

16. An apparatus according to claim 13, wherein the head is of tunnel erase type.

17. An apparatus according to claim 13, wherein the head is of pre-erase type.

18. An apparatus according to claim 13, wherein said first writing means includes means for supplying a write current having a constant value to said access means, and said second writing means includes means for supplying the write current decaying with the time to said access means.

19. An apparatus according to claim 18, wherein said second writing means includes charging/discharging means for charging to a predetermined voltage while the write data is written and discharging while the dummy data is written, and the write current supplied from said first and second writing means to said access means is determined by a voltage of said charging/discharging means.

* * * * *